Figure 1:
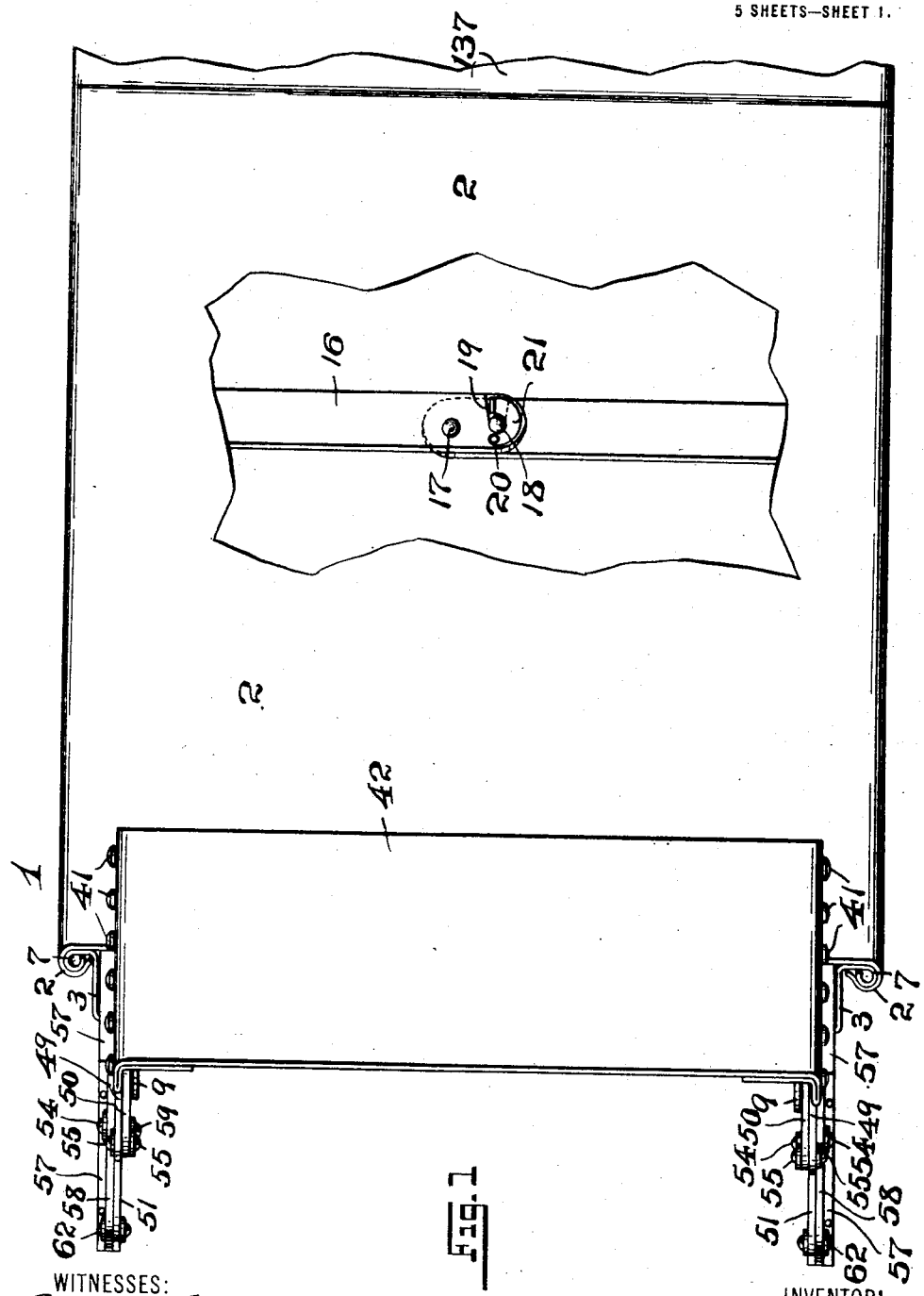

A. EBBECKE.
BODY SUPPORT OR REST AND HEAD REST THEREFOR.
APPLICATION FILED AUG. 19, 1916.

1,274,020.

Patented July 30, 1918.
5 SHEETS—SHEET 1.

WITNESSES:

INVENTOR:
Albert Ebbecke,
BY
Fraentzel and Richards,
ATTORNEYS

A. EBBECKE.
BODY SUPPORT OR REST AND HEAD REST THEREFOR.
APPLICATION FILED AUG. 19, 1916.

1,274,020.

Patented July 30, 1918.
5 SHEETS—SHEET 4.

WITNESSES:

INVENTOR:
Albert Ebbecke,
BY
Fraentzel and Richards
ATTORNEYS

A. EBBECKE.
BODY SUPPORT OR REST AND HEAD REST THEREFOR.
APPLICATION FILED AUG. 19, 1916.

1,274,020.

Patented July 30, 1918.
5 SHEETS—SHEET 5.

WITNESSES:
Fredk. H. W. Fraentzel
Henry W. Maurer

INVENTOR:
Albert Ebbecke,
BY
Fraentzel and Richards,
ATTORNEYS

UNITED STATES PATENT OFFICE.

ALBERT EBBECKE, OF NEWARK, NEW JERSEY.

BODY SUPPORT OR REST AND HEAD-REST THEREFOR.

1,274,020.  Specification of Letters Patent.  Patented July 30, 1918.

Application filed August 19, 1916. Serial No. 115,844.

*To all whom it may concern:*

Be it known that I, ALBERT EBBECKE, a citizen of the United States, residing at Newark, in the county of Essex and State of New Jersey, have invented certain new and useful Improvements in Body Supports or Rests and Head-Rests Therefor; and I do hereby declare the following to be a full, clear and exact description of the invention, such as will enable others skilled in the art to which it appertains to make and use the same, reference being had to the accompanying drawings, and to characters of reference marked thereon, which form a part of this specification.

This invention relates, generally, to improvements in sanitary pillows and body-supports; and the present invention has reference, more particularly, to a novel combined body-rest and head-rest therefor, the said body-rest being adjustable with relation to the reclining body, and the head-rest being adjustable with relation to the said body-rest and with relation to the head of the person resting upon said body-rest.

The present invention relates also to a novel and simply-constructed sanitary pillow or head-support which is adapted for use as a head-rest and is quickly and easily adjusted so as to provide a support for the head of the body in a reclining or in a sitting posture in the bed, couch, or other suitable place.

The present invention, therefore, has for its principal object to provide a novel and simple construction of combined adjustable body-rest and head-rest therefor, the said head-rest being independently adjustable of the adjustable relation of the body-rest, and the said adjustable head-rest being collapsible and slidably disposed with relation to the body-rest, being capable of movement beneath the main body-rest, so as to be out of the way, and to provide a small parcel for storing purposes, or when carrying the device from place to place, when the supporting members of the main body-rest are folded against said body-rest.

The device embodying the principles of the present invention is adapted for general use for restful reclining and sleeping purposes, but it will be found particularly advantageous for use in the sick-chamber, as well as in hospitals and similar institutions, the same providing a clean and sanitary device, which is comfortable in use, and which permits a free access and circulation of air about the entire device, therefore, providing a cool and restful support for the entire body, as well as for the head of the person lying or resting thereon.

The present invention has for its further object to provide in connection with the frame-work of either the body-rest, or the head-rest or pillow, and the body or head-supporting fabric connected with such frame-work, an arrangement of spring-like stretching elements which are pivotally connected with the frame-work of either the body-rest or with the frame-work of the head-rest or pillow, such stretching elements being easily and quickly manipulated and locked in their stretching relation, whereby the supporting fabric of the body-rest, as well as that of the head-rest or pillow, is maintained in a perfectly stretched and taut condition, to provide for the comfort and restful condition of the body and head of the body when in its reclining position.

Other objects of the present invention not at this time more particularly enumerated will be clearly understood from the following detailed description of the present invention.

With the various objects of the present invention in view, the said invention consists, primarily, in the novel combined body-rest or support and head-rest therefor; and, the invention consists, furthermore, in the novel arrangements and combinations of the several devices and parts, as well as in the details of the construction of the said parts, all of which will be more fully described in the following specification and then finally embodied in the clauses of the claims which are appended to and which form an essential part of the said specification.

The invention is clearly illustrated in the accompanying drawings, in which:—

Figure 1 is a plan view of a combined body-rest or support and head-rest, showing one embodiment of the principles of the present invention, certain parts of the supporting fabric of the device being represented as being broken away, and one of said broken away parts showing beneath the same, one arrangement of a pair of collapsible and pivotally connected stretching elements for bringing the said supporting fabric into its stretched and taut relation.

Figure 2:
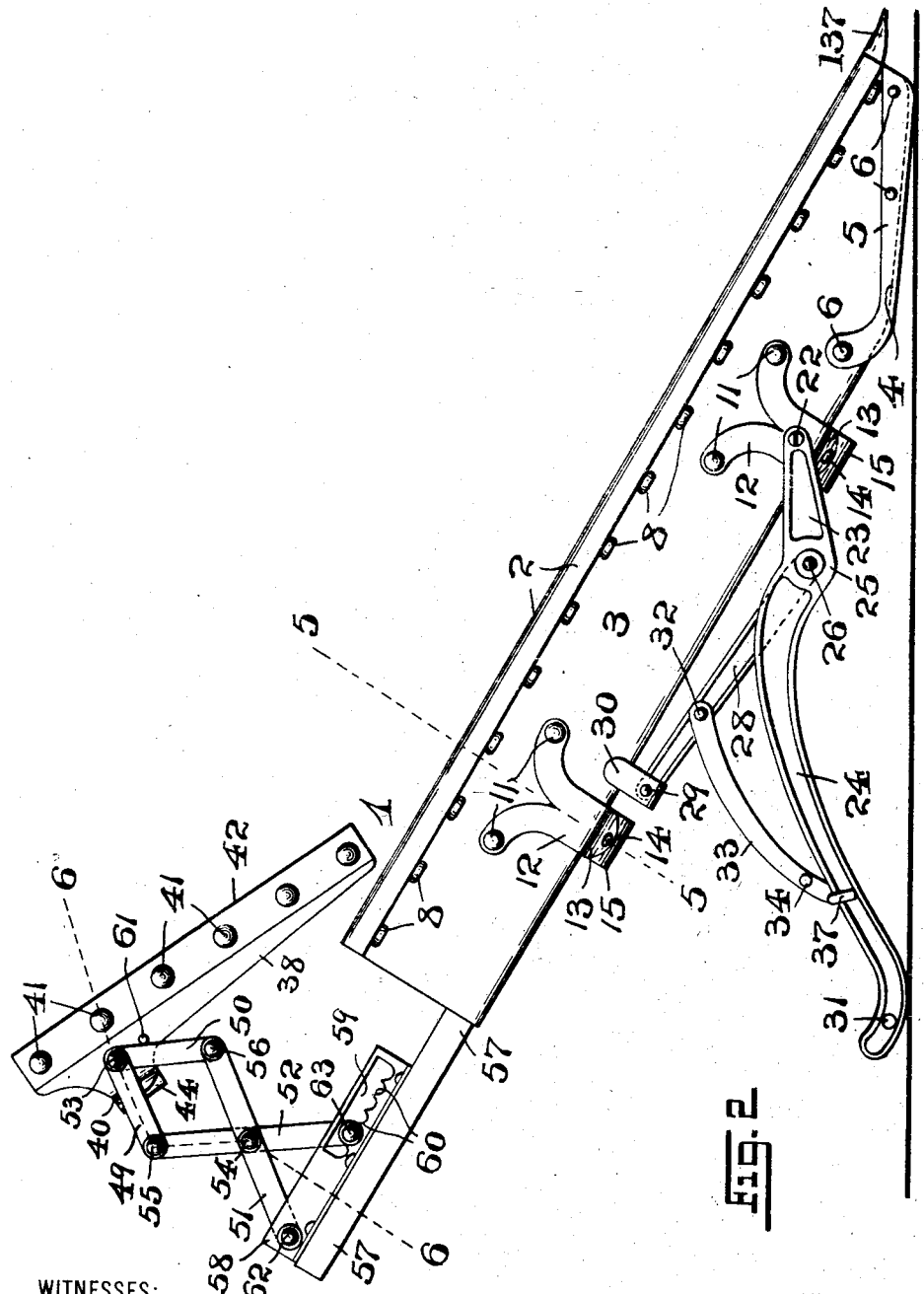
Figure 3:
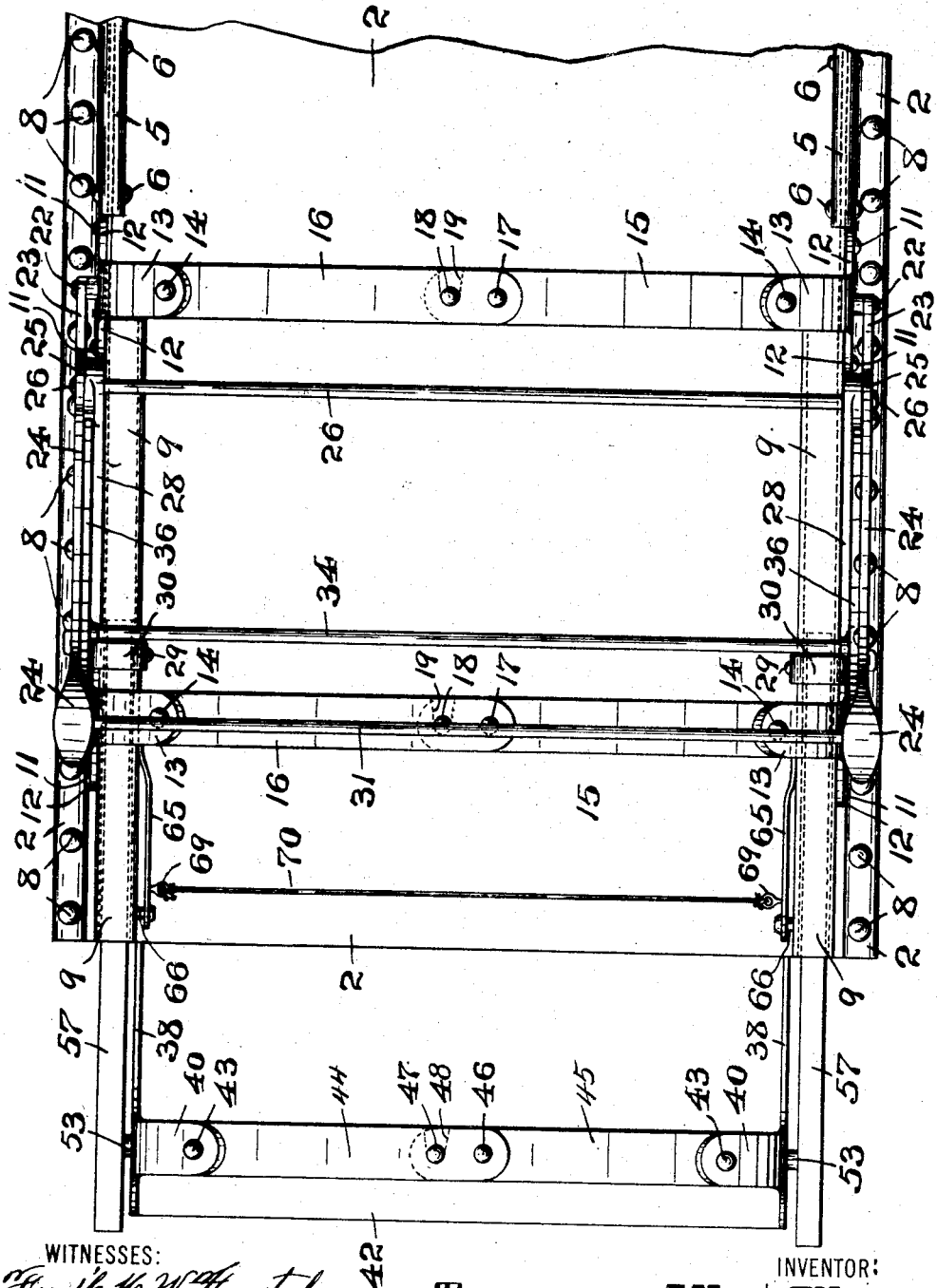
Figure 4:
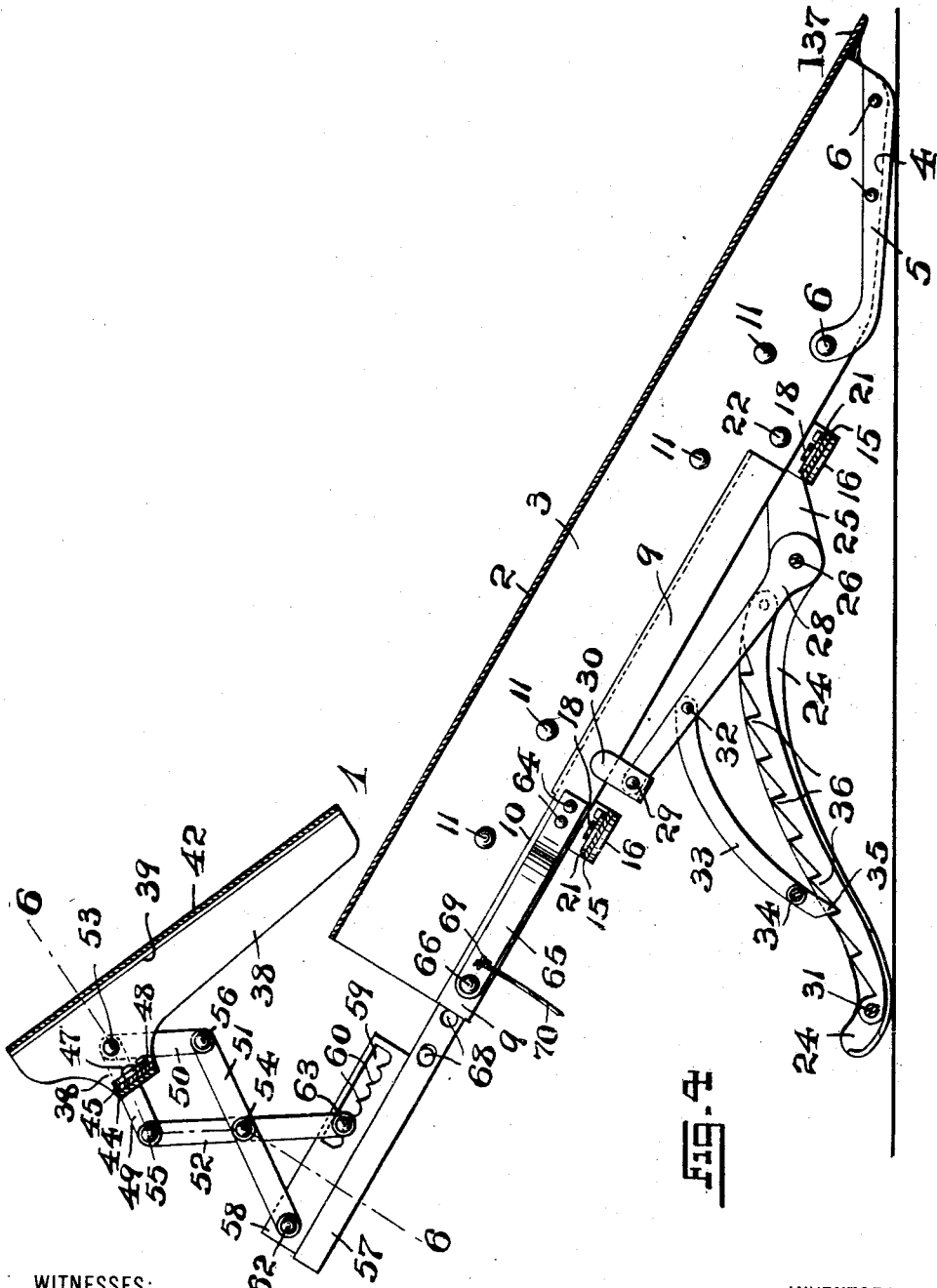

Fig. 2 is a side elevation of the said device or apparatus; Fig. 3 is a bottom view of the same, with the one end-portion of the said device or apparatus being represented broken away; and Fig. 4 is a central longitudinal vertical section of the said device or apparatus.

Figure 5:
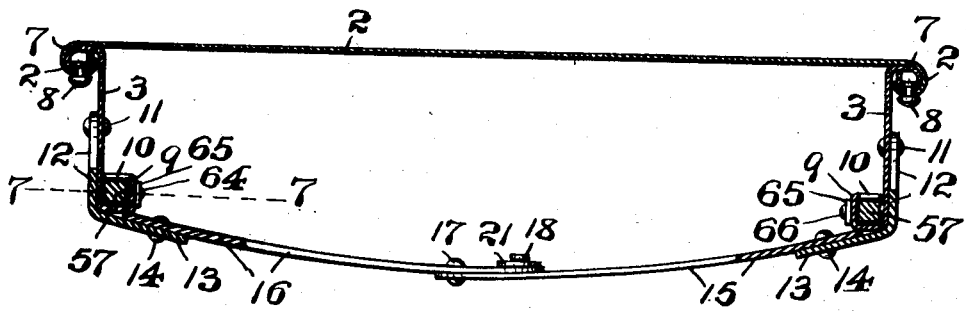
Figure 6:
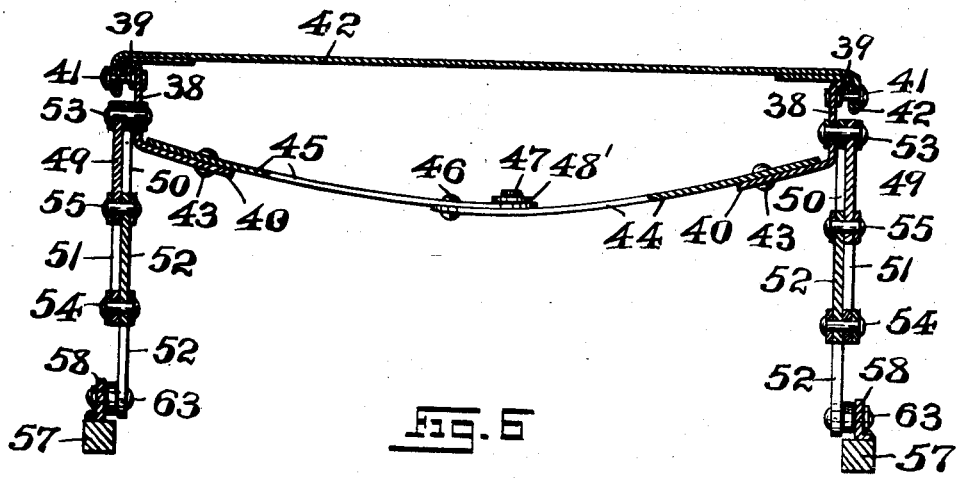
Figure 7:
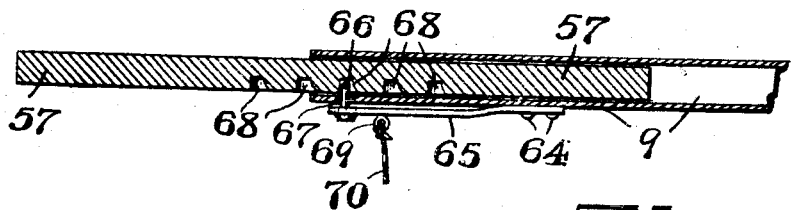

Fig. 5 is a transverse vertical section taken on line 5—5 in said Fig. 2; Fig. 6 is a similar section, said section being taken on line 6—6 in said figure; and Fig. 7 is a detail longitudinal horizontal section, in a plane on line 7—7 in Fig. 5.

Similar characters of reference are employed in the said above described views, to indicate corresponding parts.

Referring now to the said drawings, the reference-character 1 indicates the complete combined adjustable body-rest or support and head-rest therefor, illustrating one embodiment of the principles of the present invention, the same comprising a main frame-like structure combining with a supporting element 2 of a suitable fabric, such as canvas or other material suitable as a supporting element or a back-rest, a pair of side-frames, as 3, said side-frames being made of sheet metal, or being in the form of a casting, as may be desired. At one end, the lower edge-portion of each side-frame 3 is preferably angularly cut away, as at 4, and as indicated in dotted outline in Figs. 2 and 4 of the drawings, said angularly cut-away portions 4, when the said side-frames 3 are of sheet-metal, being usually reinforced with suitably formed protector-shoes, as 5, secured in place by means of rivets 6, or being secured to or connected with said side-frames in any other suitable manner.

Along their upper marginal edges the said side-frames 3 are made with bead-like members, as 7, or other suitably shaped reinforcing ribs, which may be provided with suitably shaped securing devices, fasteners, or buttons, as 8. The previously-mentioned supporting fabric 2 is stretched across the space formed between the said side-frames 3, the longitudinally extending edge-portions of said fabric 2 being lapped over and around the said bead-like members or ribs 7, and being provided with suitably disposed openings or button-holes, may be suitably buttoned or fastened to said securing devices, fasteners, or buttons 8, substantially as indicated in the several figures of the drawings.

Along their lower marginal edges the said side-frames 3 are provided with suitably-shaped duct-like elements or members, as 9, preferably of rectangular cross-section, each member 9 having an open portion 10 extending for some distance along the top-wall of each member 9. The said members 9 provide suitable guides for the purposes hereinafter more fully stated.

Suitably attached to the said side-frames 3, by means of rivets 11, or other suitable fastening means, are brackets, as 12, each bracket, as will be seen from an inspection of Fig. 5 of the drawings, being formed with an inwardly projecting and slightly downwardly extending member 13. Pivotally connected with pivot-pins or posts, as 14, with which the members 13 of the brackets 12 are provided, are suitably bowed elements 15 and 16 having spring-like properties, of suitable stretching devices, each pair of elements 15 and 16 being made to overlap, as shown, and being pivotally connected, as at 17. That each pair of such pivotally connected members or elements 15 and 16 may be retained in their relatively straightened out relation, so as to extend from one to the other side-frames 3, to thereby spread or force the said side-frames sufficiently apart and thereby produce a taut or tightly stretched supporting surface of the fabric 2 between the said side-frames, one of the said members or elements 15 is provided with a headed stud or post 18, while the other member or element 16 is slotted, as at 19, thereby permitting the slotted end-portion of said member or element 16 to enter into holding engagement with said stud or post 18. Pivotally mounted upon the said slotted end-portion of the member or element 16, by means of a rivet 20, or the like, is a suitably formed holding catch, as 21, or other suitable locking or retaining means, which can be readily moved over the slot 19 into holding engagement with the headed stud or post 18, as will be clearly evident. Of course, it will be understood, that any other methods of securing said supporting fabric 2 and the said stretching members or elements to the said side-frames may be employed, and hence, I do not limit myself to the means herein shown and described, which may be taken to be merely illustrative of one form of means adapted for the purposes stated.

Connected with the said side-frames 3, by means of pivot-posts or pins 22, or other suitable means of pivotal connection, is an adjustable supporting frame for maintaining the main body-rest or support in any one of its angularly adjusted positions, as indicated in Figs. 2 and 4 of the drawings. This supporting frame comprises a pair of foot-pieces, consisting of a pair of arms 23 and 24, joined by means of a perforated hub or eye-portion 25, which hubs or eye-portions of the two foot-pieces are suitably tied by means of a laterally disposed tie-rod or bar 26, or the like. The free end-portions of the said arms 23 are provided with perforations for pivotally mounting said arms, with relation to each side-frame 3, upon said previously-mentioned pivot-posts or pins 22. Pivotally mounted upon said tie-rod 26, adjacent to each hub or eye-portion 25, is a link 28, each link 28 having suitably secured upon its free end-portion, by means of a rivet or pin 29, or otherwise suitably connected therewith, a U-shaped or bifurcated guide-member or element, as 30, each guide-member or element 30 embracing the lower edge-portions of the said side-frames 3 and the said duct-like elements or members 9, so as to be slidably connected with the said side-frames 3 and the elements or members 9, for the proper guiding arrangement of the said foot-pieces with relation to the side-frames 3, when making necessary adjustments of the supporting frame, as will be clearly evident. At their lower end-portions the said arms 24 of the foot-pieces are tied by means of a laterally extending tie-rod or bar 31, or the like, and pivotally connected with said links 28 at suitable points, by means of rivets or pivot-pins 32, are a pair of ratchet-members or dogs, as 33, suitably connected by means of a laterally extending tie-rod or bar 34, said ratchet-members or dogs 33 having their lower free end-portions 35 slidably in operative engagement with the teeth of suitable ratchets, as 36, with which the said arms 24 are provided, substantially as illustrated in Fig. 4 of the drawings. The said ratchet-members or dogs 33 may also be provided at their lower end-portions with guide-links, as 37, which embrace the upper edge-portions of the said arms 24 for the proper guidance of the parts in making adjustments, and, furthermore, to prevent any possible lateral displacement of the engaging ends of said members or dogs 33 from the teeth of the ratchets 36.

From the foregoing it will be clearly evident, that the just described supporting frame for the main body-rest readily permits of any suitable angular adjustment of the said body-rest, and the degree of elevation of the pivotal support with relation to the side-frames 3 and the fabric-support 2 may be regulated or adjusted according to the desire or necessity of the person using the rest.

It will also be understood, that the fabric-support 2, at the end 137 may, where the same is represented in Figs. 1, 2, and 4 of the drawings as being broken away, be extended any desired length beyond the corresponding ends of the side-frames 3, so that the person may also lie upon this extended portion 137, to prevent slipping away of the main body-rest from beneath the back of the user; or, when the device or apparatus is used upon the sick-bed, this extended fabric-portion serving as a means for maintaining the sanitary condition of the bed-linen.

As has been stated, in addition to the main body-rest or support there may be combined therewith, in adjustable relation to the said body-rest, as well as to the head of the person reclining upon said body-rest, a head-rest, one embodiment of which is shown in the several figures of the drawings.

The form of head-rest herein shown comprises a pair of side-frames 38, which may be made of sheet-metal, or may be made in the form of castings, each side-frame being provided along its upper marginal edge-portion with a flange-like element or member 39. The lower marginal edge-portions of the said side-frames 38 are of the marginal conformation shown in Figs. 2 and 4 of the drawings, and are provided with inwardly projecting and slightly downwardly extending bracket-like members or elements, as 40. Suitably connected with and extending from the outer sides of said side-frames 38, at points suitably beneath the said flange-like elements or members 39 are suitably disposed securing devices, fasteners, or buttons, as 41, for separable attachment thereto of the lapped-over edge-portions of a suitable fabric-support 42, which may be of canvas, leather, or any other suitable material, when stretched over the said side-frames 38, substantially as illustrated in Figs. 2 and 6 of the drawings.

Pivotally connected with pivot-pins or posts, as 43, with which the said bracket-like members or elements 40 are provided, are suitably bowed elements 44 and 45 having spring-like properties, providing a suitable stretching device.

These elements are made to overlap, said overlapping portions being pivotally connected, as at 46. That the said pair of such pivotally connected members or elements may be retained in their relatively straightened-out relation, so as to extend from one to the other side-frame 38, to thereby spread or force the said side-frames sufficiently apart and thereby produce a taut or tightly stretched supporting surface of the fabric 42, between said side-frames 38, one of the said members or elements 44 is provided with a headed stud or post 47, while the other member 45 is slotted as indicated in dotted outline at 48 in Fig. 3 of the drawings, thereby permitting the slotted end-portion of said member 45 to enter into holding engagement with the said stud or post 47.

Pivotally mounted upon the said slotted end-portion of the member or element 45, in the manner of the previously described holding catch 21, is a holding catch 48', or other suitable locking or retaining means, which can be readily moved over the slot 48 into holding engagement with the stud or post 47, as will be clearly evident. Of course, it will be understood, that other methods of securing said fabric-support 42, and the said stretching members or elements 44 and 45 to the said side-frames 38 may be employed.

One means for producing the relatively adjusted relation of the said head-rests is made in the form of "lazy tongs," as here shown, consisting in the present case of an arrangement of crossed arms 49, 50, 51 and 52, the arms 49 and 50 being pivotally connected with the side-frames 38 by means of pivot-pins or rivets 53, the arms 51 and 52 being pivotally connected with each other by means of a pivot-pin or rivet 54 and to the respective arms 49 and 50 by means of pivot-pins or rivets 55 and 56.

Slidably or telescopically disposed within each duct-like element or member 9 of each side-frame 3 are suitably and correspondingly formed slide-rods or elements, as 57, the projecting end-portion of each slide-rod or element 57 being provided with an upwardly extending bracket-like member 58, formed with an open portion, as 59, and suitable ratchet-like teeth or projections, as 60. The lower end-portions of the arms 51 are pivotally mounted upon pivot-pins 62 which extend from the inner sides of the said bracket-like members 58. The arms 52 are provided at their lower end-portions with laterally extending pins or projections, as 63, for engagement with the ratchet-teeth or projections 60, thereby permitting, as will be clearly understood, suitable vertical adjustment of the head-rest, the angular adjustment of the side-frames 38 and the fabric-support stretched thereon being made upon the pivotal supports 53. Adjustment of the head-rest toward the main body-rest is due to the slidable arrangement of the slide-rods or elements 57 in the respective duct-like elements or members 9. To retain the said slide-rods or elements 57 in fixed relation within the said duct-like members 9, the said members have suitably secured upon their oppositely disposed outer faces, by means of rivets 64, or other suitable fastening means, spring-like plates or members, as 65, the said plates or members being provided with laterally projecting holding pins or studs 66 which extend into and through holes or perforations 67 in the respective duct-like elements 9, and are adapted to be brought into separable holding or retaining engagement with any one of a series of pin receiving depressions 68, or the like, with which the side slide-rods or bars 57 are provided, substantially as shown in Fig. 7 of the drawings. In order to simultaneously remove both pins or studs 66 connected with the respective plates or members 65 from the holes or perforations in the respective slide-rods or bars 57, so as to permit of the adjustable movements of said slide-rods or bars 57 in the duct-like elements 9, the said spring-like plates or members 65 are provided with suitably disposed eyes, as 69, or other suitable means of attachment, for the securing to the same of the ends of a flexible cord 70, as shown in the several figures of the drawings. From an inspection of Fig. 3 of the drawings, it will be evident, that a pull upon the said cord or other flexible pin or stud-operating means will withdraw the said pins or studs 66 from their retaining engagement with the said slide-rods or bars 57, so that the latter can be moved back or forth in said duct-like elements 9, as will be clearly evident. This action will permit of the head-rest, when lowered, to be moved directly beneath the fabric-support of the main body-rest, when the device or apparatus is not in use. The angular movement of the side-frames 38 is limited by a pin or stud 61, as indicated in Fig. 2 of the drawings.

From the foregoing description it will be apparent, that the present invention provides a novel and simply constructed body-rest or support and a head-rest therefor, all of which are readily and quickly adjustable to support both body and head of the user in any desired position, the same providing a support which is cool and comfortable; and, the fabric-supports being readily detached from the various side-frames can be washed so as to at all times provide a perfectly clean and sanitary body-support and head-rest.

Of course, I am fully aware that changes may be made in the general arrangements and combinations of the various devices and parts, as well as in the details of the construction of the said parts, without departing from the scope of the present invention as set forth in the foregoing specification, and as defined in the clauses of the claim which are appended thereto and which form an essential part of the said specification. Hence, I do not limit my present invention to the exact arrangements and combinations of the said devices and parts as described in the said specification, nor do I confine myself to the exact details of the construction of the said parts as illustrated in the accompanying drawings.

I claim:—

1. In an apparatus of the character specified, a main supporting frame angularly adjustable with relation to the plane of support, supporting element providing a body-rest mounted upon said supporting frame, an adjusting means extending from one end-portion of said supporting frame and adapted to be slid beneath the corresponding end of the body-rest, an adjusting mechanism connected with said adjusting means, said adjusting mechanism being movable in directions toward or away from said adjusting means, and a head-rest mounted upon said adjusting mechanism, all arranged so that the head-rest can be moved beneath the end-portion of said body-rest, or may be moved in an upward direction above the end-portion of the body-rest and toward the body-rest, so that a portion of said head-rest will extend over a portion of the body-rest.

2. In an apparatus of the character specified, a main supporting frame angularly adjustable with relation to the plane of support, a supporting element providing a body-rest mounted upon said supporting frame, an adjusting means extending from one end-portion of said supporting frame comprising a plurality of sliding elements adjustable longitudinally with relation to said body-rest and adapted to be slid beneath the corresponding end of the body-rest, an adjusting mechanism connected with said sliding elements, said adjusting mechanism being movable in directions toward or away from said sliding elements, and a head-rest mounted upon said adjusting mechanism, all arranged so that the head-rest can be moved beneath the end-portion of said body-rest, or may be moved in an upward direction above the end-portion of the body-rest and toward the body-rest, so that a portion of said head-rest will extend over a portion of the body-rest.

3. In an apparatus of the character specified, a main supporting frame angularly adjustable with relation to the plane of support, a supporting element providing a body-rest mounted upon said supporting frame, an adjusting means extending from one end-portion of said supporting frame comprising a plurality of sliding elements adjustable longitudinally with relation to said body-rest and adapted to be slid beneath the corresponding end of the body-rest, an adjusting mechanism connected with said sliding elements, said adjusting mechanism comprising lazy-tongs pivotally and adjustably connected with said sliding elements, and a head-rest mounted upon said lazy-tongs, all arranged so that the head-rest can be moved beneath the end-portion of said body-rest, or may be moved in an upward direction above the end-portion of the body-rest and toward the body-rest, so that a portion of said head-rest will extend over a portion of the body-rest.

4. In an apparatus of the character specified, a main body-rest or support comprising a pair of side-frames, a fabric support stretched between said side-frames, a means of angular adjustment connected with said side-frames, duct-like elements connected with said side-frames, and a head-rest having guide-rods extending into said duct-like elements and slidably disposed within said duct-like elements.

5. In an apparatus of the character specified, a main body-rest or support comprising a pair of side-frames, a fabric support stretched between said side-frames, a means of angular adjustment connected with said side-frames, duct-like elements connected with said side-frames, a head-rest having guide-rods extending into said duct-like elements and slidably disposed within said duct-like elements, the said duct-like elements being provided with pin-receiving perforations, and the said guide-rods being provided with a series of pin-receiving retaining depressions, a spring-like plate mounted upon each duct-like element, retaining pins extending from said spring-like plates into the perforations of said duct-like elements and adapted to be sprung into retaining engagement with the depressions of said guide-rods, and a flexible connection between said spring-plates for simultaneously disengaging said retaining pins from said retaining depressions.

6. In an apparatus of the character specified, a main body-rest or support comprising a pair of side-frames, a fabric-support stretched between said side-frames, a means of angular adjustment connected with said side-frames, duct-like elements connected with said side-frames, and a head-rest comprising side-frames, a fabric-support stretched between said side-frames, guide-rods extending into said duct-like elements and slidably disposed within said duct-like elements, and means between the side-frames of said head-rest and the said guide-rods for vertical adjustment of said head-rest.

7. In an apparatus of the character specified, a main body-rest or support comprising a pair of side-frames, a fabric-support stretched between said side-frames, a means of angular adjustment connected with said side-frames, duct-like elements connected with said side-frames, and a head-rest comprising side-frames, a fabric-support stretched between said side-frames, guide-rods extending into said duct-like elements and slidably disposed within said duct-like elements, means between the side-frames of said head-rest and the said guide-rods for vertical adjustment of said head-rest, the said duct-like elements being provided with pin-receiving perforations, and the said guide-rods being provided with a series of pin-receiving retaining depressions, a spring-like plate mounted upon each duct-like element, retaining pins extending from said spring-like plates into the perforations of said duct-like elements and adapted to be sprung into retaining engagement with the depressions of said guide-rods, and a flexible connection between said spring-plates for simultaneously disengaging said retaining pins from said retaining depressions.

8. In an apparatus of the character specified, a main body-rest or support comprising a pair of side-frames, a fabric-support stretched between said side-frames, a means of angular adjustment connected with said side-frames, duct-like elements connected with said side-frames, and a head-rest comprising side-frames, a fabric-support stretched between said side-frames, guide-rods extending into said duct-like elements and slidably disposed within said duct-like elements, means connected with said guide-rods for vertical adjustment of the said head-rest, and means of pivotal adjustment between said means of vertical adjustment and the side-frames of said head-rest.

9. In an apparatus of the character specified, a main body-rest or support comprising a pair of side-frames, a fabric-support stretched between said side-frames, stretching elements pivotally connected with said side-frames, said stretching elements being also pivotally connected with each other, means connected with said stretching elements for retaining said elements in their stretched relation, a means of angular adjustment connected with said side-frames, duct-like elements connected with said side-frames, and a head-rest comprising side-frames, a fabric-support stretched between said side-frames, stretching elements pivotally connected with said last-mentioned side-frames, said stretching elements being also pivotally connected with each other, means connected with said last-mentioned stretching elements for retaining said elements in their stretched relation, guide-rods extending into said duct-like elements and slidably disposed within said duct-like elements, and means between the said side-frames of the head-rest and the said guide-rods for vertical adjustment of said head-rest.

10. In an apparatus of the character specified, a main body-rest or support comprising a pair of side-frames, a fabric-support stretched between said side-frames, stretching elements pivotally connected with said side-frames, said stretching element being also pivotally connected with each other, means connected with said stretching elements for retaining said elements in their stretched relation, a means of angular adjustment connected with said side-frames, duct-like elements connected with said side-frames, and a head-rest comprising side-frames, a fabric-support stretched between said side-frames, stretching elements pivotally connected with said last-mentioned side-frames, said stretching elements being also pivotally connected with each other, means connected with said last-mentioned stretching elements for retaining said elements in their stretched relation, guide-rods extending into said duct-like elements and slidably disposed within said duct-like elements, means connected with said guide-rods for vertical adjustment of the said head-rest, and means of pivotal adjustment between said means of vertical adjustment and the side-frames of said head-rest.

11. A body-support or head-rest comprising a pair of side-frames, a fabric-support stretched between said side-frames, resilient stretching-elements each stretching element being pivotally connected at one end with a side-frame, said stretching elements being pivotally connected at their opposite ends with each other, and a locking means connected with said stretching elements at their means of pivotal connection for retaining the same and said fabric-support in their stretched relation.

12. A body-support or head-rest comprising a pair of side-frames, a fabric-support stretched between said side-frames, stretching-elements pivotally connected with said side-frames, said stretching elements being pivotally connected with each other, and means connected with said stretching elements for retaining the same and said fabric-support in their stretched relation, combined with a means of vertical adjustment in the form of "lazy-tongs" pivotally connected with said side-frames, and a supporting means carrying a ratchet-element, the end-portions of the arms of said "lazy-tongs" being respectively pivoted to said support and coöperating with said ratchet-element for the adjustment of said body-support or head-rest.

In testimony, that I claim the invention set forth above I have hereunto set my hand this 16th day of August, 1916.

ALBERT EBBECKE.

Witnesses:
FRED'K I. FRAENTZEL,
HENRY W. MAUSS.

Copies of this patent may be obtained for five cents each, by addressing the "Commissioner of Patents, Washington, D. C."